July 31, 1962  E. A. MADEJ  3,047,179
BOTTLE CAPS AND THE LIKE
Filed May 3, 1961  2 Sheets-Sheet 1

INVENTOR
Edward A. Madej

July 31, 1962 E. A. MADEJ 3,047,179
BOTTLE CAPS AND THE LIKE
Filed May 3, 1961 2 Sheets-Sheet 2

INVENTOR
Edward A. Madej
his attorneys

United States Patent Office 3,047,179
Patented July 31, 1962

3,047,179
BOTTLE CAPS AND THE LIKE
Edward A. Madej, 1209 Riverview Drive, Verona, Pa.
Filed May 3, 1961, Ser. No. 107,516
4 Claims. (Cl. 215—73)

This invention relates to bottle caps and the like and particularly to a closure for milk bottles.

A conventional milk bottle and similar bottles for various purposes are notoriously difficult to pour from, difficult to open and close and difficult to maintain in a sanitary, easily dispensing condition.

I have invented a cap or closure for bottles such as milk bottles which solves these problems. The cap of my invention pours smoothly and stops clearly. It is readily opened and closed and maintains the milk in a clean, sanitary condition.

Preferably I provide an annular resilient body portion defining a reservoir, a cover on said annular body portion having an elliptical opening defined on one side by a portion of the sidewall of the elliptical opening, a lip on said wall at the elliptical opening, a depending dog on the cover at the opposite edge of the ellipse and adapted to releasably engage the edge of the lip and depending flange means on the annular body adapted to engage a bottle to be used.

Preferably vent means are provided on the cover to control the rate of pour and the lip means is provided with a flow breaking edge.

In the foregoing general statement I have set out certain objects, advantages and purposes of this invention. Other objects, advantages and purposes will be evident from a consideration of the following description and the accompanying drawings in which.

Figure 1:
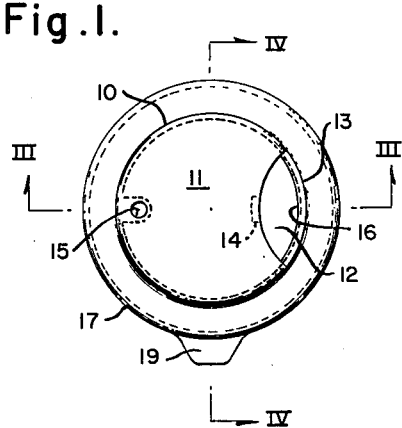
FIGURE 1 is a top plan view of a cap according to my invention.
Figure 2:
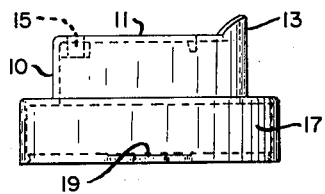
FIGURE 2 is a side elevation of the cap of FIGURE 1.
Figure 3:
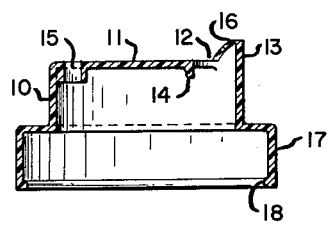
FIGURE 3 is a section on the line III—III of FIGURE 1 with the pouring spout open.
Figure 4:
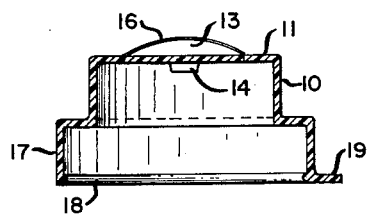
FIGURE 4 is a section on the line IV—IV of FIGURE 1.

Referring to the drawings I have illustrated an annular body portion 10 of polyethylene, rubber, or the like resilient material. A cover 11 of the same material is attached to the top of the annular body portion and is provided with an elliptical opening 12 defined along one side by a lip 13 extending above the cover and adapted to be bent back to close the elliptical opening 12 and be engaged by a dog 14 depending from the cover at edge of the elliptical opening.

A vent 15 is provided in the cover to aid in controlling the flow from the spout. A feather edge 16 on the periphery of the lip 14 acts to cut off the flow without drip.

A depending flange 17 extends below the body 10 and is adapted to slip over the edge of a bottle to be sealed. A rolled edge 18 engages the bottle to prevent the cap from slipping off and a tab 19 aids in removal of the cap from one bottle for placement on another.

In use the flange 17 is forced over the top edge of a bottle to be sealed. A rolled edge 18 engages the bottle to prevent the cap from slipping off and a tab 19 aids in removal of the cap from one bottle for placement on another.

Figure 5:
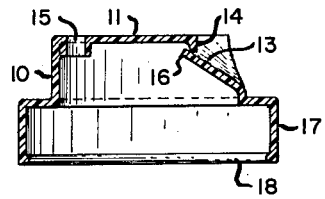
FIGURE 5 is a section on the line III—III of FIGURE 1 with the pouring spout closed.
Figure 6:
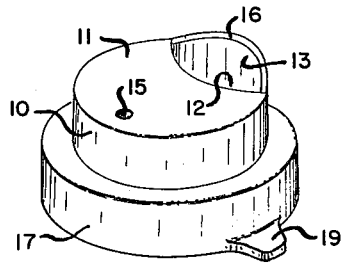
FIGURE 6 is an isometric view of the cap of FIGURE 1 with the pouring spout 1 in the open poosition.
Figure 7:
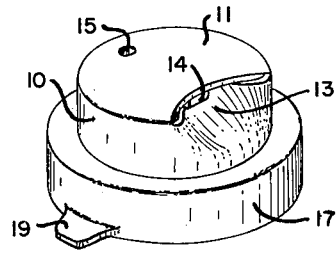
FIGURE 7 is an isometric view of the cap of FIGURE 1 with the pouring spout in closed position.

In use the flange 17 is forced over the top edge of the bottle and the rolled edge 18 engages the sidewall to hold it in position. The cap is closed by bending lip 13 back beneath the dog 14 (see FIGURES 5 and 7). When it is desired to pour from the bottle the cap is squeezed on diametrically opposite ends of the ellipse causing the cover to rise in the center thereby lifting dog 14 away from lip 13 and releasing it to the position shown in FIGURES 1–4 and 6.

This cap may be readily removed or replaced by one hand. It may be opened and closed by one hand and is a simple, inexpensive solution to the problem of capping bottles such as milk bottles.

Figure 8:
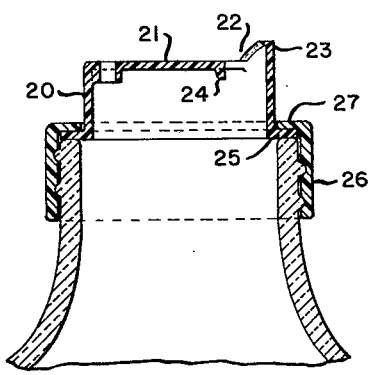
FIGURE 8 is a section of a second embodiment of my invention.
Figure 9:
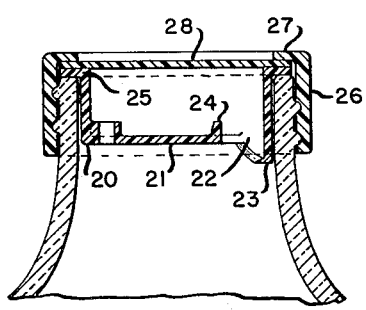
FIGURE 9 is a section of the embodiment of FIGURE 8 in shipping condition.
Figure 10:
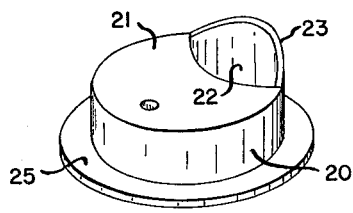
FIGURE 10 is an isometric exploded view of the element of FIGURES 8 and 9.
Figure 10:
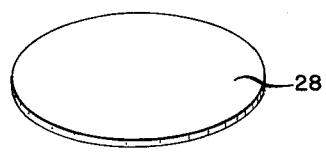
Figure 10:
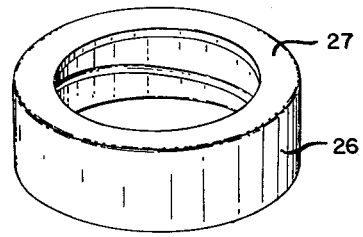

In the embodiment illustrated in FIGURES 8, 9 and 10 I have illustrated an annular body portion 20 forming a reservoir adapted to fit into a bottle to be covered, a cover 21 having an elliptical opening 22 bounded on one side by a lip 23 and provided on the opposite side with closing dog 24. A radially outwardly extending flange 25 is provided on the bottom of the annular body 20 to rest on the top edge of the bottle opening. An annular holding ring 26 having an inturned flange 27 adapted to rest over flange 25 is provided.

The body portion 20 is inverted into the mouth of the bottle, covered by a standard flat disc closure 28 and held in place by holding ring 26 for purposes of shipment and delivery (see FIGURE 9). In use the closure disc 28 is removed, the annular body 20 set upright (see FIGURE 8), the holding ring 26 placed over the flange 25, with flange 27 holding it in place, and forced or screwed onto the bottle top.

The operation of the structure of FIGURES 8–10 is identical to that of FIGURES 1–7.

While I have illustrated and described certain preferred embodiments of my invention in the foregoing specification it will be understood that this invention may be otherwise embodied within the scope of the following claims.

I claim:

1. A cap for bottles and the like comprising a resilient cylindrical body portion, a cover integral with said body portion at one end having an elliptical opening therein bounded on one edge by the wall of the cylinder and an integral lip thereon extending above the plane of the cover, a depending dog on the opposite edge adapted to releasably engage the edge of the lip when the lip is bent over the elliptical opening and depending holding ring means on the opposite end of the body portion adapted to fit over and engage a bottle top to be covered.

2. A cap for bottles and the like comprising a resilient cylindrical body portion, a cover integral with said body portion at one end having an elliptical opening therein bounded on one edge by the wall of the cylinder and an integral lip thereon extending above the plane of the cover, a depending dog on the opposite edge adapted to releasably engage the edge of the lip when the lip is bent over the elliptical opening, radial flange means on the opposite end of the body portion and an annular depending holding ring on said flange adapted to fit over and engage a bottle top to be covered.

3. A cap for bottles and the like comprising a resilient cylindrical body portion, a cover integral with said body portion at one end having an elliptical opening therein bounded on one edge by the wall of the cylinder and an integral lip thereon extending above the plane of the cover, a depending dog on the opposite edge adapted to releasably engage the edge of the lip when the lip is bent over the elliptical opening, radial flange means on the opposite end of the body portion, and a removable depending holding ring adapted to fit over and engage the radial flange and a bottle top to be covered.

4. A cap for bottles and the like comprising a resilient cylindrical body portion, a cover integral with said body portion at one end having an elliptical opening therein bounded on one edge by the wall of the cylinder and an integral lip thereon extending above the plane of the cover, a depending dog on the opposite edge adapted to releasably engage the edge of the lip when the lip is bent over the elliptical opening, vent means in said cover, and depending holding ring means on the opposite end of the body portion adapted to fit over and engage a bottle top to be covered.

References Cited in the file of this patent

UNITED STATES PATENTS

| | | |
|---|---|---|
| 2,203,133 | Englert | June 4, 1940 |
| 2,543,470 | Ryan | Feb. 27, 1951 |
| 2,760,665 | Zenker | Aug. 28, 1956 |